Figure 1:
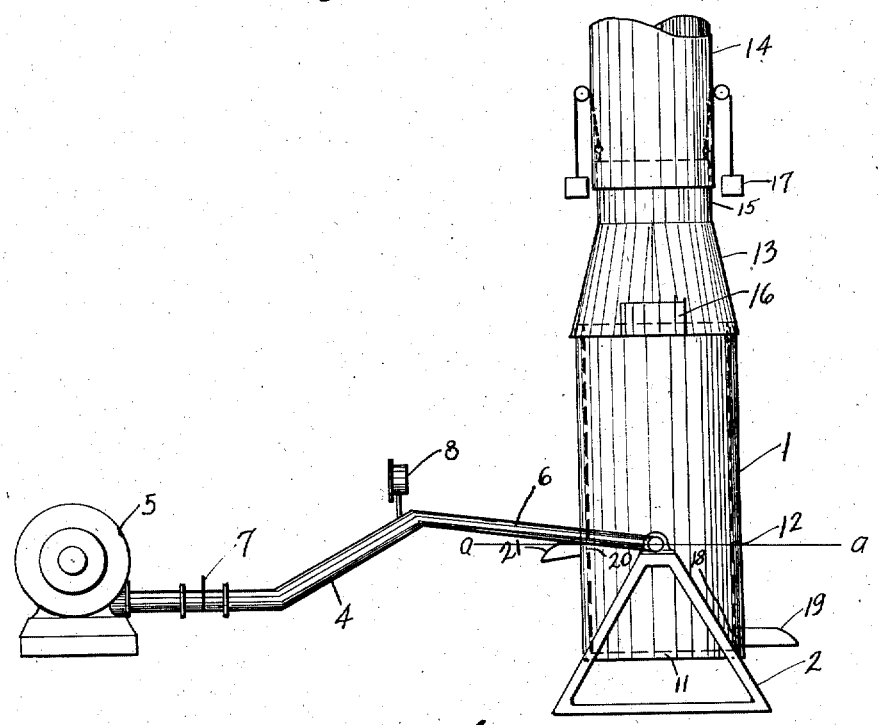
Figure 2:
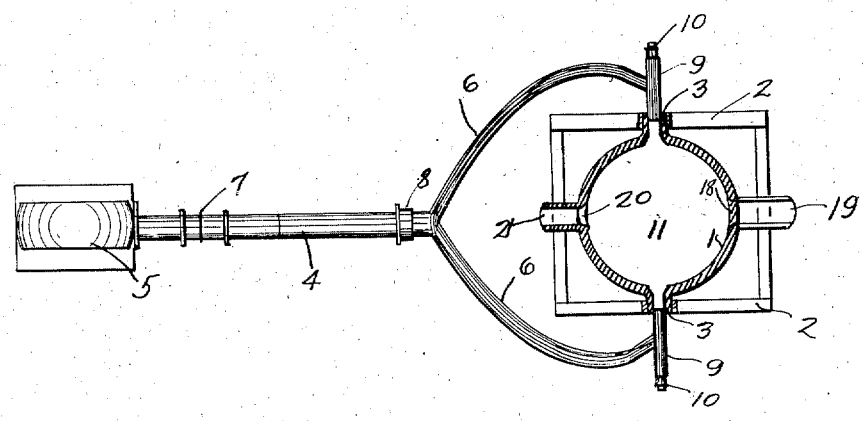

July 2, 1929. D. CUSHING Re. 17,347

PROCESS FOR MELTING AND REFINING OF NONFERROUS METALS

Original Filed Dec. 7, 1923

Daniel Cushing, Inventor

By his Attorney,
Chas. W. Mortimer

Reissued July 2, 1929. Re. 17,347

UNITED STATES PATENT OFFICE.

DANIEL CUSHING, OF CAMBRIDGE, MASSACHUSETTS, ASSIGNOR TO THE BARRETT COMPANY, A CORPORATION OF NEW JERSEY.

PROCESS FOR MELTING AND REFINING OF NONFERROUS METALS.

Original No. 1,556,591, dated October 13, 1925, Serial No. 679,107, filed December 7, 1923. Application for reissue filed October 12, 1927. Serial No. 225,829.

Heretofore the melting of non-ferrous metals and their alloys has been accomplished in a variety of ways either for the purpose of purifying them or modifying their characteristics or treating them with other substances or merely for the purpose of getting them into a liquid state so that they could be poured into molds or cast into ingots.

One of the most common methods of melting such metals or their alloys is to introduce them into crucible furnaces that are heated from the outside by using gas, oil, coal, coke or other fuels. Objections and difficulties often arise because the crucibles are expensive and differ in characteristics; the heat from the fuel must be transferred through the walls of the crucible to the material inside thus reducing the thermal efficiency and causing high fuel costs; and, due to the fact that each crucible is necessarily of comparatively small size, a large number are required where large castings are to be produced.

When reverberatory furnaces are used for melting metals the fuel cost is higher than it would be if the material to be melted were in direct contact with incandescent fuel, and it is difficult to control the operations which require skilled operators and careful manipulation and in these furnaces the flexibility as to tonnage cast is limited.

Electric furnaces are also sometimes used for this purpose but entail large cost for power and great expense for installation and repair.

It has been known for a long time that cupola furnaces afford the cheapest means of melting iron because of the direct contact between the metal and fuel with a corresponding maximum absorption of heat. At the same time such units can be built and operated in various sizes, are easily controlled, and the same furnace can be charged with charges of different sizes at different times. While cupolas are commonly used for melting iron they have not proven satisfactory for the melting of non-ferrous metals for several reasons, among which may be mentioned the following:—non-ferrous metals absorb sulfur from the fuels; the heavy blast of air commonly used in such furnaces for iron causes the formation of metallic oxides which, combining with sulfur from the fuel, form gases and cause blow holes to be formed in the casting; when it is attempted to melt non-ferrous metals the presence of slag from the necessary fluxing of the ash in ordinary fuels is very objectionable in most non-ferrous metals; fuels differ from each other and even different batches of fuel from the same source are sufficiently different from each other as to cause difficulty and require constant exercise of diligence in order to obtain an approximately correct and proper control of the gases and of the slag; and some non-ferrous metals, such as those containing zinc for example, suffer great losses from volatilization in the ordinary cupola furnaces.

Py the present invention difficulties and objections of prior known methods have been overcome and non-ferrous metals have been readily and satisfactorily melted in a cupola furnace in a rapid and efficient manner without great loss of material.

One of the features that has contributed to the successful development of my invention is the selection of the right sort of fuel, or a fuel having the proper characteristics, for melting non-ferrous metals or their alloys in a cupola furnace. I have found that a fuel will operate satisfactorily for this purpose if it has sufficient mechanical strength or resistance to crushing to enable it to support a cupola charge, provided it is at the same time substantially free from sulfur and ash and and other deleterious materials and also possesses sufficient thermal capacity, or sufficient B. t. u. per pound, to enable it to develop the requisite amount of heat without necessitating such a strong air blast that an excessive oxidizing atmosphere is present in the furnace. An example of such a fuel is the coke obtained from coking coal tar pitch in a bee hive oven. This coke is mechanically strong, consists of about 98% to 99% of fixed carbon, is substantially free from sulfur and ash, has no phosphorous and posesses about 14,500 B. t. u. per pound.

In carrying out this invention I may use a cupola furnace similar to those already in common use in which the metals are laid on the coke or layers of metal and coke alternate and the combustion is maintained by the introduction of air through tuyères near the bottom of the furnaces. By restricting the ingress of air it has been found that sufficient combustion can be maintained so that the metals can be melted and at the same time a reducing atmosphere can be maintained near the metal so that excessive oxidation can be obviated. By proper regulation of the air, metallic oxides can be reduced to the metals themselves. Due to the high thermal value of the fuel used the non-ferrous metals will not freeze with the restricted draft used. When the metal is melted it may be withdrawn from the cupola in the ordinary manner into a ladle, run into molds, cast into ingots, or otherwise disposed of by using special reservoirs, pouring devices or casting machines.

This invention has been found applicable to the melting and purification of a very large number of non-ferrous metals and their alloys, for example, such as copper, nickel, aluminum, tin, antimony, lead and zinc.

The invention will be more specifically and particularly described in its application to the melting of copper and of bronze in a cupola furnace but it is to be understood that it is not to be restricted to the melting of these particular metals or to this particular type of furnace.

In practising this invention I may employ a cupola furnace such as is illustrated in the accompanying drawings in which Figure #1 is an elevation and Figure #2 is a plan view partly in section.

In the drawings, reference character 1 designates a cupola that may be mounted on a base or frame 2 by means of hollow projections 3. The hollow projections 3 serve as tuyères and a branched blast pipe 4 leads from a blower 5 or any other convenient source for producing an air blast through the branches 6 to the hollow projections or tuyères 3. The pipe 4 is provided with a valve 7 for regulating the blast and a gauge 8 for measuring the same. The branches 6 each have an opening 9 with a removable plug 10 therein so that natural draft through the tuyères 3 may be substituted when the blower 5 is shut off and the plugs 10 are removed.

The cupola 1 has its bottom 11 lined with refractory material such as fire brick, sand or the like and the cupola is lined with fire resisting material 12 suitable for non-ferrous metals. A housing 13 surrounds the upper end of the cupola 1 and leads to a stack 14 to which it is connected by means of the slip joint 15 so that the housing can be raised whenever repairs to the cupola are required or the same is to be relined. The housing 13 is provided with a door 16 through which the materials can be charged into the cupola. The housing 13 is also provided with counterweights 17 to facilitate raising the same. A tap hole 18 and spout 19 are provided near the bottom of the cupola and a slag hole 20 and a spout 21 are provided at a somewhat higher elevation.

My improved process of melting and refining non-ferrous metals may be carried out in such a furnace as follows: A thin layer of coke that is mechanically strong and substantially free from sulfur and ash and phosphorus is placed in the bottom of the cupola and ignited and the cupola is gradually filled with this coke to a depth of about a foot or two above the tuyères. The coke may be ignited in any convenient manner, preferably by means of a gas or blow torch, the tap hole 18 and the openings 9 being left open until the furnace is ready to be charged with metal. It is desirable to have the bottom of the cupola as well as the tap hole hot in the refining of these non-ferrous metals. After the bottom of the cupola has become hot and the coke has become incandescent, the metal is placed thereon and alternate layers of coke and metal may be charged, the metal thus being in direct contact or association with the coke when and as the coke burns and becomes incandescent. The openings 9 are then stopped with plugs 10 and the tap hole 18 is closed by plugging, for example, with a hard ball of cotton waste, preferably oily or greasy, and moist molding sand. The blast from the source 5 is then turned on and enters the furnace through the tuyères 3. The pressure and amount of air through the tuyères is much less than is customary with cupola furnaces for melting iron. It appears to be only necessary to supply sufficient air to support combustion of the coke without oxidizing the metal, so that instead of having 7 ozs. of pressure at the tuyères as is customary with an iron melting cupola furnace of about 18 in. diameter at the bottom and 7 ft. 6 in. in height, an air pressure of 2 to 4 ozs. is enough to carry out my process. It has been found that it requires about three minutes of running with the blast to melt bronzes, or four or five minutes to melt copper. In some instances it has been found that the metal can be melted with the draught produced by the stack 14 with the plugs 10 removed without using a forced draught from the source 5. When the metal is melted the tap hole 18 can be opened and the molten metal withdrawn; by continually charging coke and metal through the door 16 the process can be made continuous, the molten metal in such a case flowing out through the tap hole 18. If fluxing is necessary because of the nature of the material being treated, the slag can be drawn off at intervals through the slag hole 20.

It has been found that by using the coke as above described in a cupola furnace for melting non-ferrous metals, the metal when drawn out of the tap hole 18 is in a refined state and is of high quality and does not require a subsequent refining operation.

My improved process of melting and refining non-ferrous metals as above described has been found to result in a lower fuel consumption than is necessary with either a crucible or reverberatory furnace; the melting and refining can be accomplished in a shorter period of time than with other types of furnaces; the gases escape up the stack instead of escaping into the plant as is often the case in non-ferrous foundries and smelting works; the coke to be used by this process can be obtained of substantially uniform quality thus eliminating uncertainties in the results; the shape and size of the metal to be melted is immaterial. The low blast enables fine material such as borings and turnings or other similar fine materials to be melted, while the large sizes are limited only by the size of the charging door; and a very small amount of slag is produced from ash in the fuel as there is substantially no ash in the coke.

By the term "non-ferrous metal" as used in the specification and claims is meant those metals other than ferrous metals that can be practically melted in a cupola furnace and this term is intended to include the metals, copper, nickel, aluminum, tin, antimony, lead and zinc and alloys thereof, but exclude easily oxidizable metals such as magnesium and alkali and alkaline earth metals.

By the term "copper metals" as used in the claims is meant copper, bronze and other alloys of copper.

I claim:

1. The process which comprises melting a non-ferrous metal by burning pitch coke which is substantially free from ash and materials that would have a deleterious effect upon said metal in direct contact with said metal.

2. The process which comprises melting a non-ferrous metal by burning pitch coke which is substantially free from the arsh and materials that would have a deleterious effect upon said metal and which possesses high compressive strength in direct contact with said metal.

3. The process which comprises melting a non-ferrous metal by burning coke which is substantially free from ash and materials that would have a deleterious effect upon said metal and which contains at least 98% of fixed carbon in direct contact with said metal.

4. The process which comprises melting a non-ferrous metal by burning pitch coke which is substantially free from ash and materials that would have a deleterious effect upon said metal and which has a thermal value of about 14,500 B. t. u. per pound in direct contact with said metal.

5. The process which comprises melting a non-ferrous metal while in direct contact with incandescent pitch coke which is substantially free from ash and materials that would have a deleterious effect upon said metal, air being admitted to said incandescent coke and metal during the melting of said metal in quantity sufficient to prevent an excessive oxidizing atmosphere.

6. The process which comprises melting a non-ferrous metal while supported by pitch coke which is substantially free from ash and materials that would have a deleterious effect upon said metal by burning said coke in a cupola furnace in contact with said metal.

7. The process which comprises melting a non-ferrous metal in a cupola furnace by burning pitch coke which is substantially free from ash and materials that would have a deleterious effect upon said metal in contact with said metal, the air blast through said coke during the melting of said metal being maintained below the pressures maintained in cupola furnaces for melting ferrous metals.

8. The process which comprises refining impure copper by melting it by burning pitch coke which is substantially free from ash and materials that would have a deleterious effect upon said copper and which possesses high compressive strength in contact with said copper.

9. The process which comprises melting impure copper while in direct contact with incandescent pitch coke which is substantially free from ash and materials that would have a deleterious effect upon said copper, air being admitted to said incandescent coke and metal during the melting thereof in quantity sufficient to provide a reducing atmosphere.

10. The process which comprises melting a non-ferrous metal in a cupola furnace by burning in association therewith, pitch coke made in a beehive oven and which is substantially free from ash and materials that would have a deleterious effect upon said metal.

11. The process which comprises melting copper metals while supported by pitch coke which is substantially free from ash and materials that would have a deleterious effect upon said metals by burning said coke in contact with said metals.

12. The process which comprises melting copper in a cupola furnace by burning in association therewith, at a temperature in excess of the melting point of copper, pitch coke made in a beehive oven and which is substantially free from ash and materials that would have a deleterious effect upon the copper.

13. The process which comprises melting a non-ferrous metal in a cupola furnace by burning in association therewith, at a temperature in excess of the melting point of the metal, pitch coke which is substantially free from ash and materials that would have a deleterious effect upon said metal and which possesses high compressive strength.

14. The process which comprises melting a non-ferrous metal in a cupola furnace by burning in contact therewith pitch coke made in a beehive oven and which contains at least 98% of fixed carbon and has a thermal value of about 14,500 B. t. u. per pound.

15. The process which comprises melting copper metals in a cupola furnace by burning in contact therewith pitch coke made in a beehive oven and which contains at least 98% of fixed carbon and has a thermal value of about 14,500 B. t. u. per pound.

16. The process which comprises melting copper metals by burning pitch coke which is substantially free from ash and materials that would have a deleterious effect upon said metals in direct contact with said metals.

In testimony whereof I affix my signature.

DANIEL CUSHING.